(12) United States Patent
Bajorek

(10) Patent No.: US 6,363,599 B1
(45) Date of Patent: Apr. 2, 2002

(54) METHOD FOR MANUFACTURING A MAGNETIC DISK INCLUDING A GLASS SUBSTRATE

(75) Inventor: Christopher H. Bajorek, Los Gatos, CA (US)

(73) Assignee: Komag, Inc., San Jose, CA (US)

( * ) Notice: Subject to any disclaimer, the term of this patent is extended or adjusted under 35 U.S.C. 154(b) by 0 days.

(21) Appl. No.: 09/369,030

(22) Filed: Aug. 4, 1999

(51) Int. Cl.⁷ ................................................ B23P 17/00
(52) U.S. Cl. .................... 29/424; 360/135; 427/154; 428/43; 451/44; 29/424
(58) Field of Search ................... 29/527.2, 412, 29/424; 360/135; 427/154, 289; 428/43, 167; 451/36, 41, 44, 439

(56) References Cited

U.S. PATENT DOCUMENTS

| | | |
|---|---|---|
| 3,338,696 A | 8/1967 | Dockerty |
| 3,682,609 A | 8/1972 | Dockerty |
| 3,899,314 A | 8/1975 | Siegmund ...................... 65/23 |
| 4,239,712 A | 12/1980 | Neefe |
| 4,833,001 A | 5/1989 | Kijima ........................ 428/141 |
| 5,002,813 A | 3/1991 | Nakayama et al. |
| 5,087,481 A | 2/1992 | Chen et al. .................. 427/129 |
| 5,128,922 A | 7/1992 | Invi et al. |
| 5,335,526 A | 8/1994 | Garrison |
| 5,341,606 A | 8/1994 | Hirabayashi |
| 5,486,276 A | 1/1996 | Kitamoto et al. ......... 204/192.2 |
| 5,521,781 A | 5/1996 | Kaneki et al. .............. 360/135 |
| 5,538,579 A | 7/1996 | Ishimura et al. ............. 156/250 |
| 5,569,518 A | 10/1996 | Hayashi ....................... 428/141 |
| 5,622,540 A | 4/1997 | Stevens ........................ 65/112 |
| 5,743,788 A | 4/1998 | Vanell |
| 5,824,127 A | 10/1998 | Bange et al. |
| 5,826,772 A | 10/1998 | Ariglio |
| 5,914,053 A | 6/1999 | Masumura |
| 5,926,352 A | 7/1999 | Murayama et al. .......... 360/135 |
| 6,096,405 A | 8/2000 | Takahashi et al. ........... 428/141 |

OTHER PUBLICATIONS

Information Disclosure Statement submitted Mar. 26, 2001.
Patent Application entitled "Method of Mass–Producing Glass Substrates for Magnetic Disks Using a Vertical Draw Process", Gornicki et al., believed to be filed Feb. 1, 1999.

Primary Examiner—S. Thomas Hughes
Assistant Examiner—Steven A Blount

(57) ABSTRACT

A method for making magnetic disks comprises the steps of: applying a protective layer of material on a sheet of glass; b) cutting the sheet of glass into glass squares; c) stacking the glass squares; d) removing a circular core from the stack of glass squares, thereby defining the inner diameter of the glass substrates being formed; e) using a cutting annulus to cut through the stack of glass squares, thereby forming a stack of glass disks; f) subjecting the stack of glass disks to an edge polishing process to round the corners of the glass disks both at the inner and outer diameters; h) unstacking the glass disks; i) removing the protective layers from the glass disks; j) subjecting the glass disks to a chemical strengthening step; and k) sputtering an underlayer, magnetic layer and protective overcoat onto the glass substrate to thereby form a magnetic disk.

20 Claims, 5 Drawing Sheets

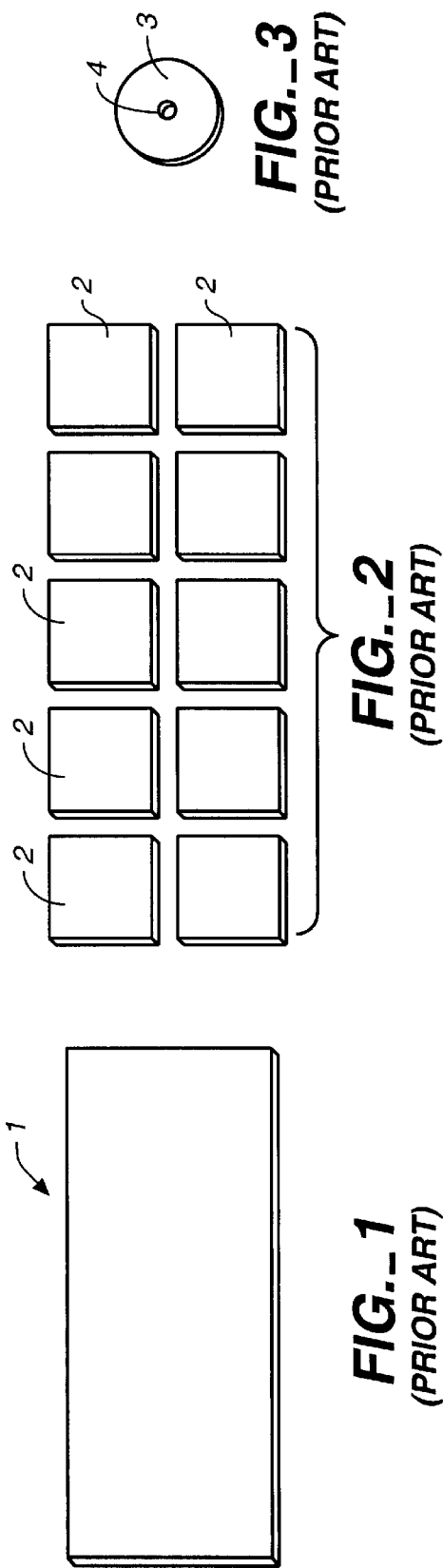
FIG._1 (PRIOR ART)
FIG._2 (PRIOR ART)
FIG._3 (PRIOR ART)
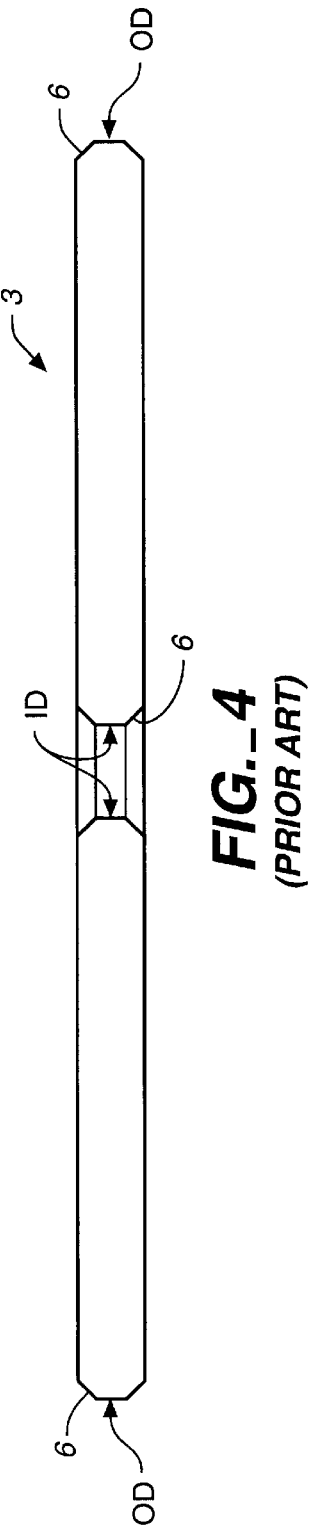
FIG._4 (PRIOR ART)

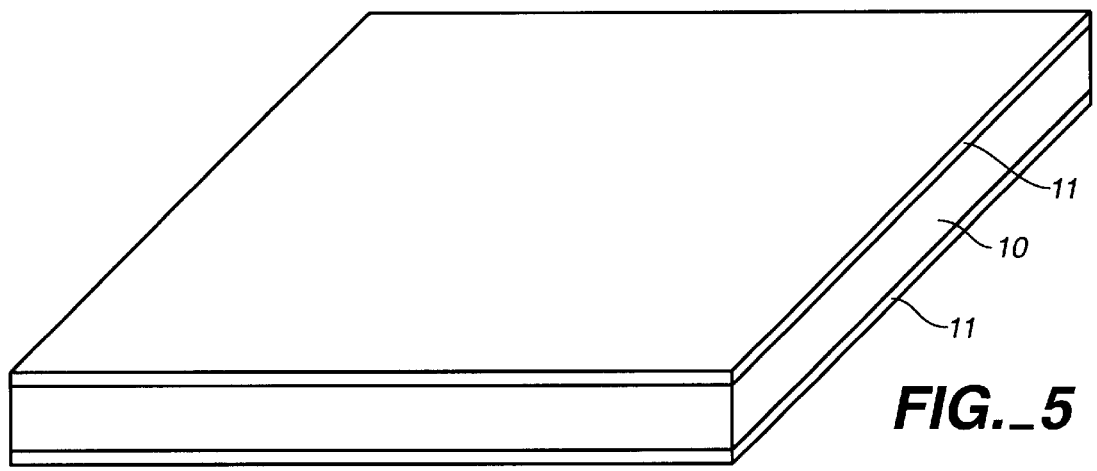
FIG._5
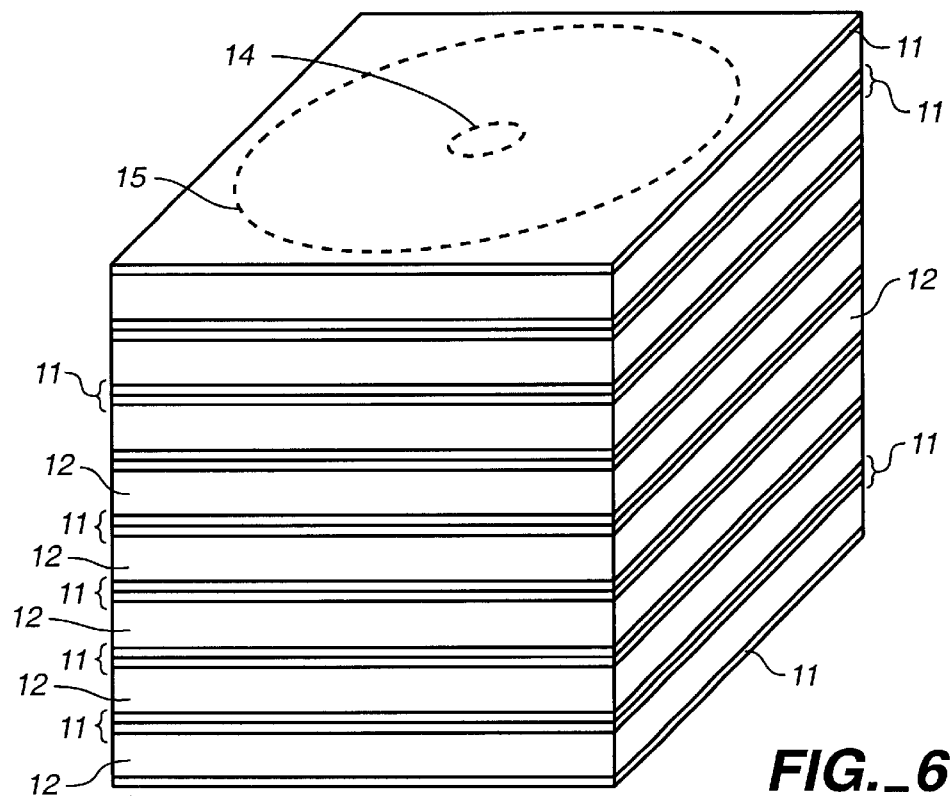
FIG._6

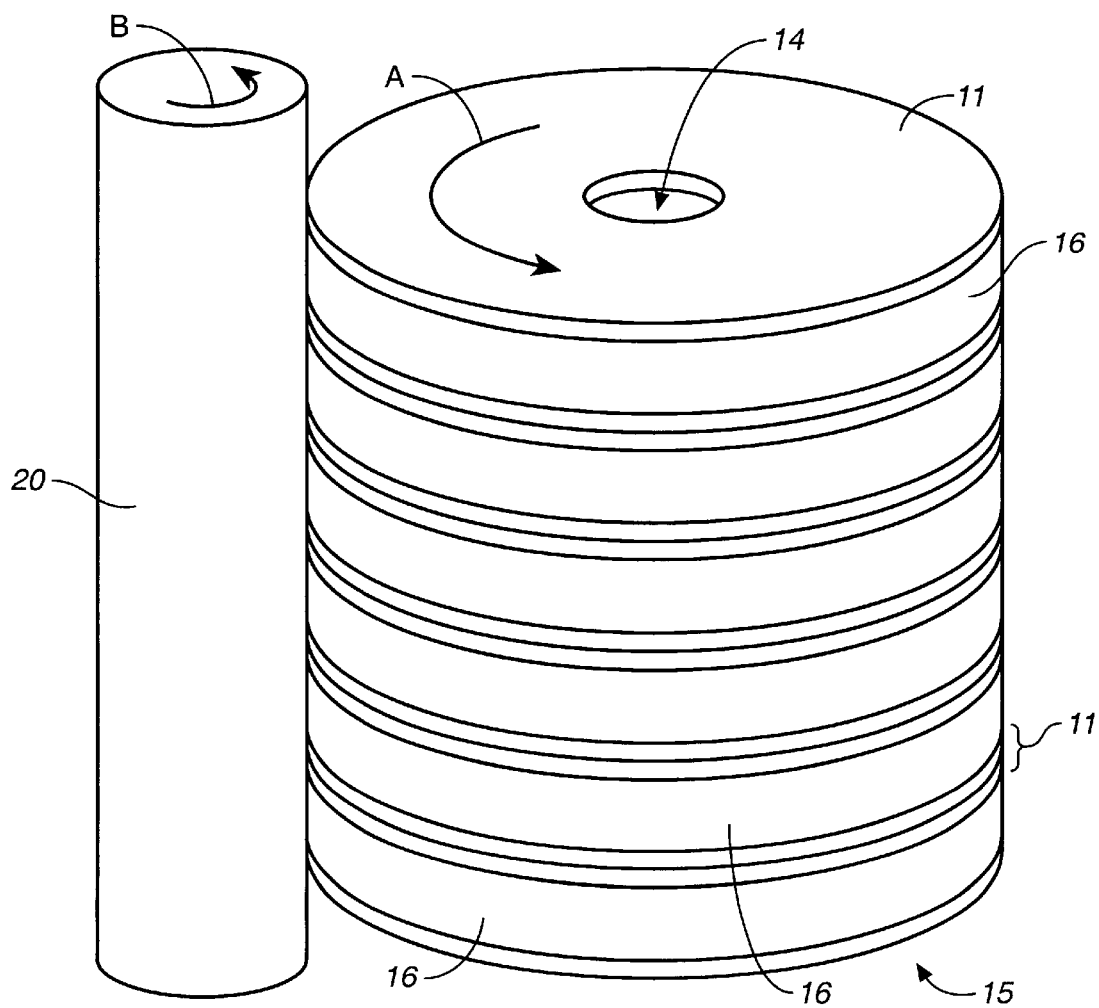
FIG._7

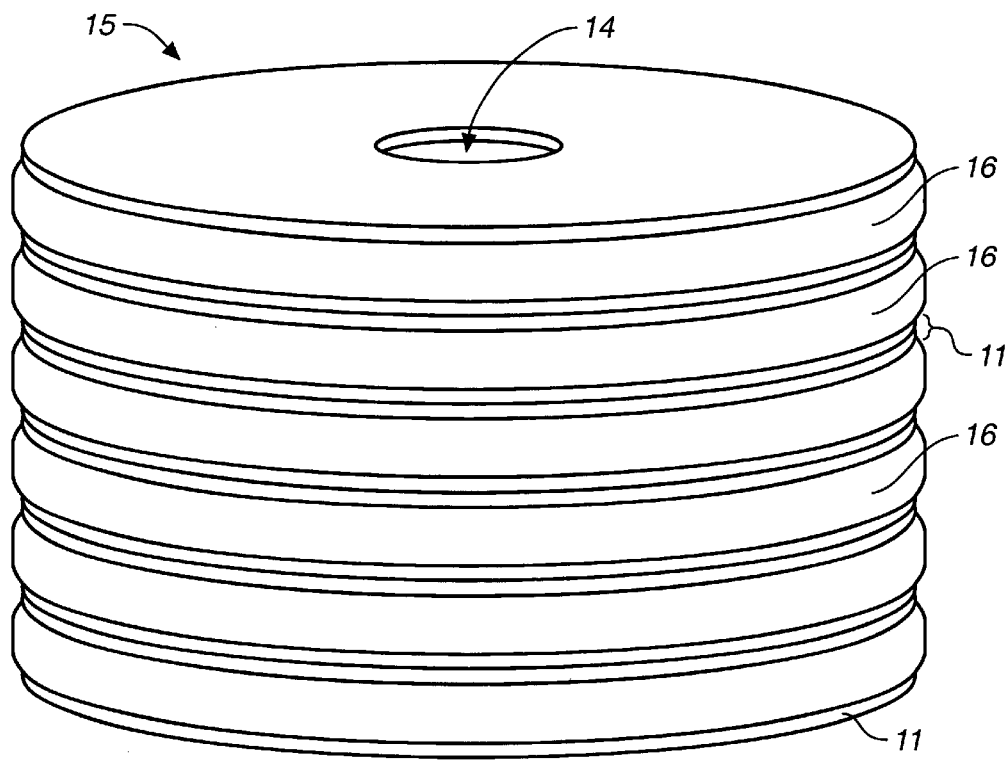
FIG._8
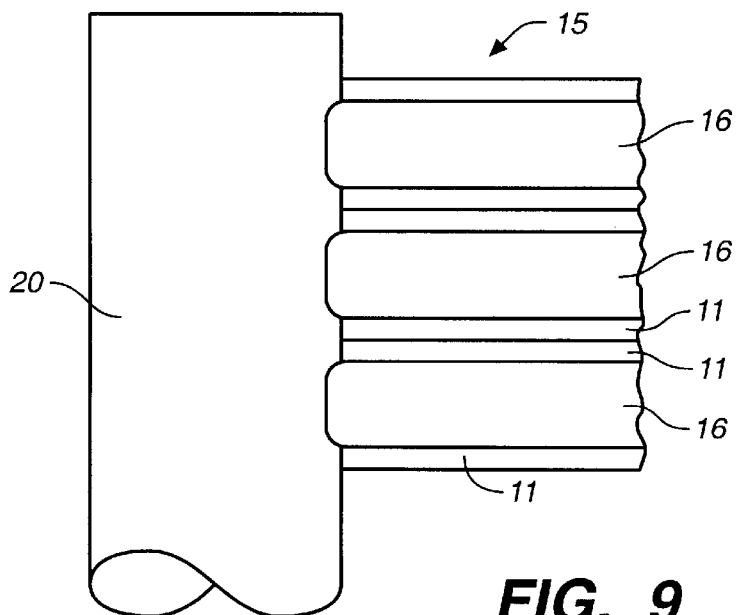
FIG._9

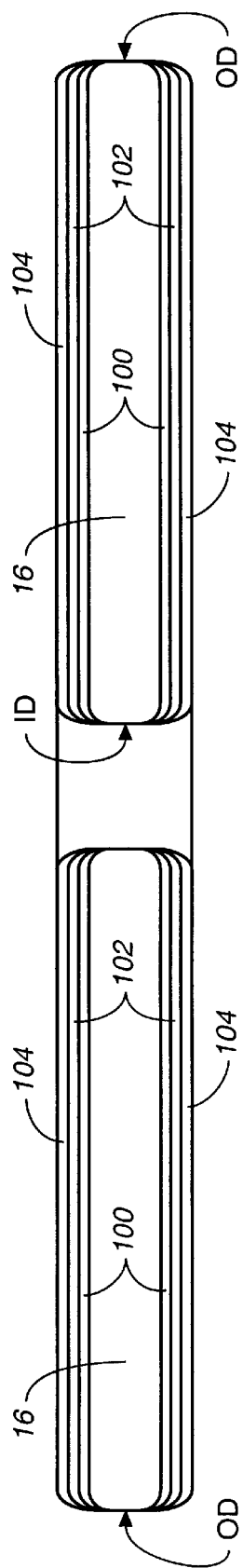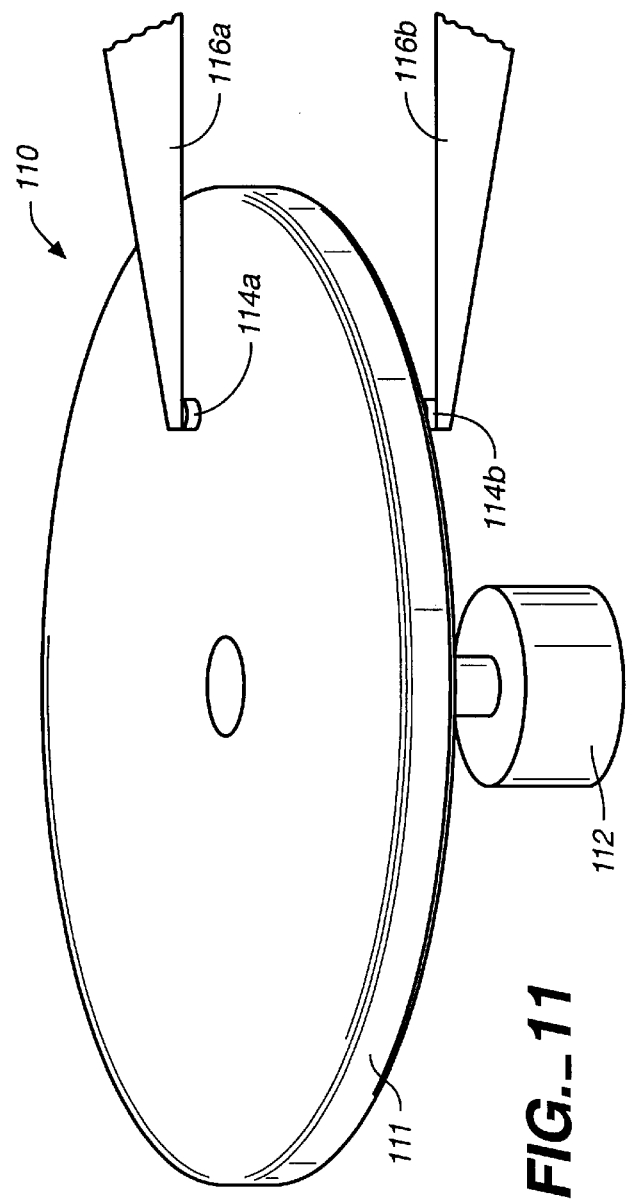

METHOD FOR MANUFACTURING A MAGNETIC DISK INCLUDING A GLASS SUBSTRATE

BACKGROUND OF THE INVENTION

This invention relates to the production of magnetic disks using glass substrates.

Most magnetic disks manufactured today comprise either aluminum or glass substrates. Glass substrates for magnetic disks are typically formed by the following process:

1. A sheet of glass 1 (FIG. 1) is prepared, e.g. by the "float method".
2. Individual "squares" of glass (e.g. square 2 of FIG. 2) are cut out of sheet 1. This is typically done using a diamond scribing process.
3. The "squares" of glass (e.g. square 2) are cut into disk-shaped substrates (e.g. substrate 3 of FIG. 3). During this cutting operation, a circular region is also cut out of an inner portion of disk shaped substrate 3 to leave a circular hole 4. After the disk is completed, hole 4 facilitates mounting of the disk on a spindle within a disk drive.
4. Chamfers (such as chamfer 6 of FIG. 4) are formed at the inner diameter ("ID") and outer diameter ("OD") of each disk 3. This is generally a difficult operation.

It is accomplished using a grinding process (which typically damages the glass material) followed by polishing chamfer 6 (to try to remove the damage).

5. After chamfer 6 is formed, the disk is subjected to multiple lapping and polishing steps. These multiple steps are necessary for at least two reasons. First, during the step of providing a chamfer, the glass is damaged, and this damage must be removed. (Merely polishing the chamfer will not remove all of the damage.) Second, during various portions of the manufacturing process, the glass is typically stacked and unstacked. During stacking an unstacking, as well as cutting, the glass is typically damaged due to glass particles that are generated during the cutting steps. These glass particles lodge on the glass prior to stacking and damage the glass.

Forming chamfers, lapping and polishing substrates constitute a great expense during substrate manufacturing. It would be highly desirable to avoid or minimize these expenses.

Summary

A method in accordance with a first embodiment of the invention comprises the acts of a) applying a protective layer of material on a glass sheet; b) cutting the glass sheet into squares; and c) stacking the glass squares for further processing. In one embodiment, the further processing includes cutting the squares into substrates. Of importance, the protective layer prevents glass particles from damaging the surface of the substrates during the further processing. Thereafter, the substrates are unstacked and the protective layers are removed.

One important feature of this embodiment of our invention is that because the glass substrate surfaces are not damaged by glass particles, it is not necessary to subject them to multiple lapping and polishing steps that would otherwise be needed to achieve defect-free surfaces. Therefore, we can use this process to provide much less expensive substrates than were previously available.

A process in accordance with a second embodiment of our invention comprises rounding the corners of the glass substrates without forming chamfers. In one embodiment, this is accomplished by applying an edge polishing step on the stacked substrates. The protective layers on the substrates are softer than glass. The ID and OD of the stacked glass substrates are subjected to a polishing process, e.g. using a slurry. The portion of the protective layers at the ID and OD are removed first. This exposes portions of the glass substrates at the corner of the ID and OD to the slurry, and permits the slurry to round the substrate corners. We have discovered it is not necessary to form chamfers in a glass substrate, and that simply rounding the substrate corners suffices in a manufacturing process. In particular, the substrate can be safely handled, although it lacks chamfers, without damaging the substrate. Also, because the edges are rounded and not sharp, the substrates can be safely handled by people and associated process equipment. Further, by not chamfering the substrate corners, we avoid the expense and damage to the glass material associated with chamfering.

After the substrates are machined as discussed above, they are used for magnetic disk, manufacturing. In one embodiment, the substrates are destacked, the protective layers are removed, and the substrates are subjected to brief, minimal polishing. Because the substrates were protected during stacking and during cutting of the glass squares into substrates, the damage which would otherwise be caused by glass particles generated during the initial cutting process is not present. Therefore, only minimal polishing is required at this point in the manufacturing process. This minimal polishing leaves the initial substrate smoothness substantially undisturbed. Further, the minimal polishing removes less substrate material, and is much less expensive, than prior art lapping and polishing steps used to manufacture prior art disk substrates. After the minimal polishing step the substrates are then cleaned.

Optionally, the substrates are then subjected to a chemical strengthening step. After chemical strengthening the substrates are again cleaned.

Thereafter, the various layers of the magnetic disk are deposited on the substrate, e.g. by sputtering. For example, an underlayer such as Cr, a Cr alloy, NiP, or NiAl is sputtered onto the substrates, followed by a magnetic Co alloy and a protective overcoat.

The glass used to practice this invention can be any type of glass, e.g. a borosilicate glass, or an alumina silicate glass. In lieu of glass, the invention can be practiced using glass ceramic substrates.

BRIEF DESCRIPTION OF THE DRAWINGS

FIG. 1 illustrates a sheet of glass

FIG. 2 illustrates glass squares cut from the sheet of FIG. 1.

FIG. 3 illustrates a glass substrate that has been cut from one of the glass squares of FIG. 2.

FIG. 4 illustrates a chamfer formed at the edges of the glass substrate of FIG. 3.

FIG. 5 illustrates a protected glass sheet that will be cut into a set of glass squares in accordance with my invention.

FIG. 6 illustrates the glass squares of FIG. 5 after the glass squares have been stacked.

FIG. 7 illustrates a stack of glass substrates being subjected to an edge polishing step in accordance with the invention.

FIG. 8 illustrates the rounded corners of a stack of glass substrates after edge polishing.

FIG. 9 illustrates the protective layers between the glass substrates being polished more rapidly than the glass substrates.

FIG. 10 illustrates a magnetic disk after an underlayer, magnetic layer and protective layer have been sputtered upon the glass substrate.

FIG. 11 illustrates a disk drive incorporating a magnetic disk constructed in accordance with the invention.

DETAILED DESCRIPTION

A method in accordance with our invention begins with the act of providing a glass sheet, such as glass sheet 10 of FIG. 5. In one embodiment, sheet 10 is formed by the float method, but other methods such as drawing or pressing can be used as well. A protective layer 11 is applied to one or both surfaces of sheet 10. Protective layer 11 can be water soluble. In one embodiment, protective layer 11 is latex, although the protective layer can be other materials as well. The protective layer prevents the glass from being damaged by glass particles generated during the various manufacturing processes described below (e.g. cutting, stacking, unstacking, etc.). Because glass 10 is protected from such damage, expensive lapping and polishing steps can be avoided during a method in accordance with my invention.

Glass sheet 10 is cut into individual glass squares, e.g. squares 12. This can be accomplished using a diamond scribe, a laser scribe, laser cutting, or other technique. In one embodiment, glass squares 12 have a length and width of 100 mm and a thickness of 1 mm, but other dimensions can be used.

Thereafter, glass squares 12 are stacked on top of each other. In one embodiment, squares 12 are bonded with an adhesive. In this way, a stack of glass squares can be processed simultaneously to minimize costs. Stacked glass squares 12 and protective layers 11 are shown in FIG. 6.

Next, the glass squares are subjected to a boring process during which a circular hole 14 (shown in phantom in FIG. 6) is drilled or bored through bonded squares 12. As will become apparent, hole 14 constitutes the ID of the glass substrates being manufactured. A second cutting tool cuts a circular section 15 (also shown in phantom in FIG. 6) out of the stack of glass squares 12. This circular section 15 constitutes a stack of the glass disk-shaped substrates 16 being manufactured. The drilling and cutting tools used during this part of the process are conventional.

Referring to FIG. 7, stack 15 of glass substrates 16 is then subjected to an edge polishing process. In one embodiment, the polishing process is a chemical-mechanical polishing ("CMP") process. This process can use polishing particles such as $CeO_2$. The slurry can also include additives such as surfactants. Alternatively, polishing agents other than $CeO_2$ can be used. The polishing process can be performed by applying the slurry with a polishing pad 20 to the exterior of stack 15 of glass substrates 16 as shown in FIG. 7. (The slurry is typically introduced between pad 20 and stack 15.) This has two major benefits.

1. It removes damaged glass material at the disk OD. (This includes glass material damaged by cutting the glass squares into disks.)
2. This polishing step rounds the edges of the substrates. (See FIG. 8). The reason that the substrate edges are rounded can be understood by referring to FIG. 9. Referring to FIG. 9, roughly cylindrical polishing pad 20 polishes the OD of stack 15 of disks 16. As can be seen, stack 15 comprises glass substrates 16 and protective layers 11. Protective layers 11 are typically made of softer material than substrates 16, and therefore wear more rapidly than substrates 16 in response to the polishing. As protective layers 11 wear, they expose the outer portions of the top and bottom surfaces of substrates 16 to the polishing slurry, thereby permitting the polishing slurry to polish the exposed portions and round the edges of the corners of substrates 16.

In FIG. 7, one polishing pad is shown polishing the OD of stack 15 of substrates 16. However, in other embodiments, two or more pads can be used to simultaneously polish the OD of the stack. During this process, stack 15 can be rotated, e.g. in the direction of arrow A. Alternatively, the pads can rotate around stack 15. In addition, pad 20 can rotate about its central axis in the direction of arrow B.

Either before, after, or concurrently with the polishing of the OD of substrates 16, the ID of substrates 16 is subjected to a similar polishing process, thereby rounding the corners of the substrates at their ID.

After polishing, substrates 16 are destacked, and the protective layers 11 are removed. (As mentioned above, in one embodiment the material of layers 11 is water soluble, and layers 11 are removed with water.) Substrates 16 are then subjected to a minimal polishing step and cleaned. This polishing step is designed to eliminate "waviness". Waviness is a high wavelength surface imperfection, e.g. a variation in flatness having a wavelength greater than the size of the read-write head used with the disk, e.g. a wavelength on the order of a few millimeters to 1 cm. Such polishing is described in U.S. patent application Ser. No. 09/262,365, filed Mar. 4, 1999 by Bajorek et al., incorporated herein by reference.

The minimal polishing step described above should not be confused by other prior art polishing steps used to remove damage caused during chamfering, cutting, stacking and destacking. During these prior art polishing steps, it is necessary to remove between 250 and 1000 $\mu$m of glass. In stark contrast, the above-described minimal polishing step removes about 5 $\mu$m of glass. Thus, the polishing performed in the present invention is much less expensive than the polishing done in prior art processing steps.

A minimal polishing step, as described above, does not substantially disturb the short wavelength smoothness of the original glass sheet (e.g. having an Ra of about 1.5 Å). (Although the as-formed glass sheet produced by the float method has a low Ra, because the prior art processes damage the glass, the glass must be substantially polished to remove the damaged material and recreate a smooth surface. Because I avoid damaging the glass during manufacturing, I can retain the initial smoothness of the glass, and do not have to subject the substrate to extensive polishing and lapping to recreate the initial smoothness.)

Optionally, at this point glass substrates 16 are subjected to a chemical strengthening step. As is well-known in the art, chemical strengthening is performed on Na-containing glass. During chemical strengthening, the substrates are immersed in a hot K-containing bath. Na ions diffuse out of the glass, while K ions diffuse into the glass. Since K ions have a greater diameter than Na ions, the K ions cause the formation of a compression region adjacent the substrate surface, which prevents the propagation of cracks through the substrate, and causes the formation of a stronger substrate.

After chemical strengthening, the glass substrate is cleaned.

Thereafter, the various layers are sputtered on substrate 16. In one embodiment, an underlayer 100, a magnetic layer 102 and a protective overcoat 104 are sputtered, in that order, on both sides of substrate 16 (see FIG. 9). Underlayer 100 can be Cr or a Cr alloy. Of importance, Cr controls the manner in which magnetic layer 102 grows. The Cr affects the magnetic characteristics, e.g. coercivity, of magnetic layer 102.

Magnetic layer 102 is typically a Co alloy. Protective overcoat 104 is typically a carbon or hydrogenated carbon protective overcoat.

After fabrication, the resulting magnetic disk is typically put in a disk drive, e.g. disk drive 110 of FIG. 10. The completed disk (designated with reference number 111) is typically coupled to a motor 112 for rotating the disk. A pair of read-write heads 114a, 114b read data from or write data to the disk while the disk is rotating. Read-write heads 114a, 114b are mounted on suspensions 116a, 116b, respectively, which in turn are coupled to an actuator for controlling the position of the read-write heads 114a, 114b relative to the various tracks of the disk.

In another embodiment of the invention, instead of stacking glass squares 12 prior to cutting squares 12 into disks, the squares are cut into disks, one at a time without being stacked. After being cut into disks, the disks are stacked and subjected to edge polishing as discussed above and shown in FIG. 7.

In yet another embodiment, the disks are not stacked prior to edge polishing. Rather, the disks are edge-polished one at a time to round the corners of the outer edges.

While the above-described process optionally includes chemical strengthening, other methods can be used to make the substrate more robust. For example, a coating can be applied to the edge of the substrate, e.g. to fill cracks, voids and the like, to reduce the possibility of crack propagation. Alternatively, one can polish the substrates to remove sharp peaks to reduce the chance of crack propagation.

While the invention has been described with respect to specific embodiments, those skilled in the art will recognize that changes can be made in form and detail without departing from the spirit and scope of the invention. For example, instead of initially cuffing the glass sheet into squares, other shapes can be used (e.g. hexagons). Also, different types of polishing materials can be used to edge-polish the disks. Instead of applying protective layer 11 before sheet 10 is cut into squares 12, protective layer 11 can be applied after sheet 10 is cut into squares 12. Different numbers of layers can be formed on the substrate when manufacturing the magnetic disk. Accordingly, all such changes come within the invention.

What is claimed is:

1. A method for manufacturing a magnetic disk comprising:
   providing a substrate having an unchamfered outer edge, said substrate having top and bottom major surfaces, an outer side surface, a first corner between said top major surface and said outer side surface, and a second corner between said bottom major surface and said outer side surface;
   polishing the unchamfered outer edge of said substrate, whereby during said act of polishing, the corners of said substrate are rounded such that there is a rounded corner between said top major surface and said outer side surface and a rounded corner between said bottom major surface and said outer side surface, but said outer side surface remains substantially straight; and
   forming a magnetic layer over said substrate.

2. Method of claim 1 further comprising:
   applying a protective layer to a sheet of substrate material;
   cutting said sheet of substrate material into individual regions of substrate material;
   stacking said regions of substrate material on top of one another to form a stack of regions of substrate material;
   cutting said stack of regions of substrate material to form a stack of circular disk substrates, said circular disk substrates being unchamfered, said substrate being one of said substrates within said stack, wherein during said polishing, the corners and edges of the substrates within said stack are polished and rounded;
   unstacking said stack of circular disk substrates;
   removing said protective layer from each of said substrates; and
   forming a magnetic layer over said substrates.

3. Method of claim 2 further comprising the act of subjecting said regions of substrate material to a coring operation to form an inner, circular hole in each of said regions within said stack.

4. Method of claim 3 wherein said substrate material is selected from a group of materials consisting of glass or glass ceramic.

5. Method of claim 3 wherein the act of cutting said stack of regions of substrate material is performed simultaneously with said act of subjecting.

6. Method of claim 3 wherein the act of cutting said stack of regions of substrate material is performed after said act of subjecting.

7. Method of claim 3 wherein the act of cutting said stack of regions of substrate material is performed before said act of subjecting.

8. Method of claim 2 wherein said act of polishing comprises a chemical mechanical polishing process.

9. Method of claim 2 further comprising the acts of providing an underlayer between said substrates and said magnetic layer and a protective overcoat over said magnetic layer.

10. Method of claim 1 further comprising the act of providing an underlayer between said substrate and said magnetic layer and a protective overcoat over said magnetic layer.

11. Method of claim 1 wherein:
   said substrate is part of a stack of substrates, said substrates within said stack having unchamfered outer edges;
   said polishing comprising polishing the unchamfered edges of said stack of substrates while said substrates are stacked, such that during said act of polishing, the corners of said stack of substrates are rounded, and at the conclusion of said polishing, the substrates comprise first and second major surfaces, a substantially cylindrical outer edge surface laterally surrounding said substrate, a first rounded corner between said first major surface and said outer edge surface, and a second rounded corner between said second major surface and said outer edge surface;
   said method further comprising unstacking said stack of substrates after said polishing; and
   forming a magnetic layer over said substrates.

12. Method of claim 11 wherein said substrates are disk-shaped, said disk-shaped substrates having unchamfered inner edges, said method also comprising the act of polishing said unchamfered inner edges of said substrates to round the corners of said inner edges.

13. Method of claim 12 wherein a layer of material is provided between said substrates within said stack, said layer of material eroding more rapidly during polishing than the substrate material, and wherein a portion of the major surfaces of said substrates are exposed when said layer of material erodes, thereby exposing said portion of said major surface and causing said edges to be rounded during polishing.

14. Method of claim 11 further comprising the acts of providing an underlayer between said substrate and said magnetic layer and a protective overcoat over said magnetic layer.

15. A method for manufacturing a magnetic disk comprising:

provideing a substrate having first and second major surfaces and an unchamfered edge;

polishing the unchamfered edge of said substrate, whereby during said polishing, the corners of said substrate at said unchamfered edge are rounded and at the conclusion of said polishing, said substrate comprises a substantially cylindrical outer surface, a first rounded corner between said first major surface and said outer surface, and a second rounded corner between said second major surface and said outer surface; and forming a magnetic layer over said substrate.

16. Method of claim 15 wherein said edge is an inner edge of said substrate.

17. Method of claim 15 wherein said providing of said substrate comprises providing a stack of substrates, said substrates having first and second major surfaces and an unchamfered edge;

and wherein said polishing comprises polishing the unchamfered edge of said stack of substrates, such that during said polishing, the corners of said substrates at said edge are rounded and at the conclusion of said polishing, said substrates comprise a substantially cylindrical outer surface, a first rounded corner between said first major surface and said outer surface, and a second rounded corner between said second major surface and said outer surface;

said method further comprising unstacking said stack of substrates; and forming a magnetic layer over said substrates.

18. Method of claim 28 wherein said edge is an inner edge.

19. Method of claim 15 further comprising providing a first layer of material against said first major surface and a second layer of material against said second major surface prior to said polishing, such that during said polishing, said first and second layers of material erode and expose portions of said first and second major surfaces to thereby facilitate the rounding of said corners.

20. Method of claim 17 further comprising providing a layer of material against said major surfaces of said stack of substrates prior to said polishing, such that during said polishing, said layer of material erodes and exposes portions of said first and second major surfaces to thereby facilitate the rounding of said corners.

* * * * *